US006862626B1

(12) United States Patent
Ryu

(10) Patent No.: US 6,862,626 B1
(45) Date of Patent: Mar. 1, 2005

(54) METHOD OF ESTABLISHING COMMUNICATION EXCHANGE BETWEEN A TERMINAL OF A PACKET-BASED NETWORK AND A TERMINAL CONNECTED TO A REMOTE ACCESS SERVER

(75) Inventor: Yeon-Seung Ryu, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 486 days.

(21) Appl. No.: 09/653,147

(22) Filed: Aug. 31, 2000

(30) Foreign Application Priority Data

Sep. 6, 1999 (KR) ........................................ 1999-37650

(51) Int. Cl.[7] ............................................ G06F 15/16
(52) U.S. Cl. ...................... 709/227; 709/249; 370/401
(58) Field of Search ................................ 709/227, 245, 709/224, 228, 225; 370/352–356, 389, 400, 401; 379/88.1; 455/435, 426, 465

(56) References Cited

U.S. PATENT DOCUMENTS

| 6,282,193 | B1 | * | 8/2001 | Hluchyj et al. ............. 370/356 |
| 6,314,284 | B1 | * | 11/2001 | Patel et al. .................. 455/417 |
| 6,374,302 | B1 | * | 4/2002 | Galasso et al. ............. 709/238 |
| 6,377,568 | B1 | * | 4/2002 | Kelly .......................... 370/352 |
| 6,400,719 | B1 | * | 6/2002 | Chimura et al. ....... 370/395.31 |
| 6,400,950 | B1 | * | 6/2002 | Patel et al. .................. 455/435 |
| 6,456,617 | B1 | * | 9/2002 | Oda et al. ................... 370/352 |
| 6,487,196 | B1 | * | 11/2002 | Verthein et al. ............ 370/352 |
| 6,490,275 | B1 | * | 12/2002 | Sengodan ................... 370/356 |
| 6,507,577 | B1 | * | 1/2003 | Mauger et al. ............. 370/356 |
| 6,539,237 | B1 | * | 3/2003 | Sayers et al. ............... 455/555 |
| 6,542,935 | B1 | * | 4/2003 | Ishii ............................ 709/245 |
| 6,628,943 | B1 | * | 9/2003 | Agrawal et al. ......... 455/432.1 |
| 6,633,985 | B2 | * | 10/2003 | Drell ........................... 713/201 |
| 6,636,596 | B1 | * | 10/2003 | Gallant et al. ......... 379/220.01 |
| 6,654,366 | B1 | * | 11/2003 | Ketcham ..................... 370/352 |
| 6,671,263 | B1 | * | 12/2003 | Potter et al. ................ 370/261 |
| 6,674,746 | B1 | * | 1/2004 | Lamarque, III ............. 370/352 |
| 6,693,874 | B1 | * | 2/2004 | Shaffer et al. .............. 370/217 |
| 2001/0043608 | A1 | * | 11/2001 | Potter et al. ................ 370/401 |

FOREIGN PATENT DOCUMENTS

| EP | 0781015 A2 | 6/1997 | .......... H04L/29/06 |
| EP | 0818908 A2 | 1/1998 | .......... H04L/29/06 |
| WO | WO9935805 | 7/1999 | ............ H04M/1/00 |

OTHER PUBLICATIONS

ITU–T Recommendation H.323, "Packet–based multimedia communications systems", Sep. 1999.*
Publication No. XP004304599; James Toga et al.; "ITU–T Standardization Activties for Interactive Multimedia Communications on Packet–Based Networks: H.323 and Related Recommendations;" Feb. 11, 1999; 19 pgs.

* cited by examiner

Primary Examiner—Frantz B. Jean
Assistant Examiner—Kimberly Flynn
(74) Attorney, Agent, or Firm—Cha & Reiter, L.L.C.

(57) ABSTRACT

A method for enabling a first terminal of a packet-based network to communicate with a second terminal connected to a remote access server includes the steps of: registering the aliases and IP addresses of the first terminal and the remote access server in the gatekeeper; letting the first terminal to send a message to the gatekeeper for requesting a connection with the second terminal; causing the gatekeeper to request the remote access server to connect with the second terminal even when the second terminal is not registered with the gatekeeper; causing the remote access server to request the second terminal to register its alias and IP address in the gatekeeper; and, establishing communication between the first and second terminals through the gatekeeper.

11 Claims, 5 Drawing Sheets

METHOD OF ESTABLISHING COMMUNICATION EXCHANGE BETWEEN A TERMINAL OF A PACKET-BASED NETWORK AND A TERMINAL CONNECTED TO A REMOTE ACCESS SERVER

CLAIM OF PRIORITY

This application makes reference to and claims all benefits accruing under 35 U.S.C. Section 119 from an application, METHOD OF ESTABLISHING COMMUNICATION EXCHANGE BETWEEN A TERMINAL OF A PACKET-BASED NETWORK AND A TERMINAL CONNECTED TO A REMOTE ACCESS SERVER, filed earlier in the Korean Industrial Property Office on Sep. 6, 1999 and there duly assigned Serial No. 37650/1999.

BACKGROUND OF THE INVENTION

1. Field of the Invention

The present invention relates to a method of establishing communication between a terminal coupled to an Internet Protocol (IP) network and a terminal coupled (via Point-to-Point Protocol (PPP) to a remote access server. More particularly, the present invention relates to a communication protocol between a gatekeeper and a remote access server.

2. Description of the Related Art

FIG. 1 illustrates a simplified network structure diagram for enabling the terminal C 12 connected to a Public Switched Telephone Network (PSTN) or Integrated Service Digital Network (ISDN) 10 to access the IP network by performing a dial-up connection to a remote access server 20. In this case, the terminal C 12 makes a direct point-to-point (PPP) connection to the remote access server 20 that is assigned to an IP address, so that the terminal 12 can exchange packet data with a particular host through the IP network 30.

FIG. 2 is a simplified network structure as recommended by International Telecommunication Union-Telecommunication (ITU-T) Standardization Sector, namely, Packet-based Multimedia Communications System, H.323. The H.323 provides a standard for enabling the H.323 terminals to make multimedia communication with each other in a packet-based network, such as IP network, which includes a gatekeeper 38, terminals 32 and 36, a gateway 34, and a Multipoint Control Unit (MCU)(not shown). The communication protocol between these entities is provided to perform network specific protocol functions. According to the communication protocol, the terminals should register their aliases and IP addresses in the gatekeeper 38 and receive admission from the gatekeeper 38 to communicate with each other. To this end, specific protocol functions, such as the Registration, Admission, Status (RAS), and the Q.931 signaling of ITU-T Line Transmission of Non-Telephone Signals H.225.0 are performed.

FIG. 3 is a flow diagram illustrating the process of exchanging messages to enable the terminal A to make a connection to the terminal B of FIG. 2 in a H.323 communication compliant network. Firstly, both the terminals A and B send Registration Request (RRQ) messages to a gatekeeper to register their aliases (or telephone number) and IP addresses in steps 50-1 and 50-3, and in turn receive Registration Confirm (RCF) messages from the gatekeeper in steps 50-2 and 50-4. Secondly, the terminals are enabled to communicate with each other using the aliases and IP addresses information retrieved from the gatekeeper. In response to retrieving the IP address information of the receiving terminal, the sending terminal A exchanges an Admission Request (ARQ) message and an Admission Confirm (ACF) message with the gatekeeper, in steps 50-5 and 50-6, in order to receive the admission for communication. Upon receiving the ACF message from the gatekeeper, the sending terminal A sends the Q.931 setup message for call signaling to the receiving terminal B in step 50-7, as shown in FIG. 3. Then, the receiving terminal B in turn exchanges the ARQ message and the ACF message with the gatekeeper, in steps 50-8 and 50-9, in order to receive the admission for communication. Upon receiving the ACF message from the gatekeeper, the receiving terminal B sends the Q.931 connection message to the sending terminal A in step 50-10, then the terminal A performs the H.245 call signaling to establish communication with the terminal B in step 50-11.

FIG. 4 illustrates a simplified structure of the combined networks in FIGS. 1 and 2. In such an environment, exchanging messages between the terminals is performed by accessing the remote access server 20 by the terminal C 12 to communicate with a specific H.232 terminal, such as terminal A 32 or B 36 connected to the IP network 30. To this end, the terminal C 12 connected to the IP network 30 should register its alias and IP address in the gatekeeper 38 and receive the admission for communication. Thus, if the terminal C 12 maintains a dial-up connection with the remote access server 20, the terminals coupled to the IP network 30 may communicate with the terminal C 12 at any time thereafter. However, when the terminal C 12 does not require communication with the terminals of the IP network 30, the terminal c 12 usually maintains an off-line connection with the remote access server 20 to save the dial-up modem connection charge. If the dial-up connection with the remote access server 20 is terminated, the terminal C 12 loses its IP address and its registered information in the gatekeeper 38. As a result, the terminals coupled to the IP network can not establish communication with the terminal C connected to a circuit network, such as PSTN or ISDN.

SUMMARY OF THE INVENTION

It is an object of the present invention to provide a method for enabling a first terminal in an IP network to communicate with a second terminal connected to a remote access server even when the second terminal has terminated the dial-up connection with the remote access server.

According to an object of the present invention, a method for enabling a first terminal on a packet-based network to communicate with a second terminal connected to a remote access server includes the steps of: registering the aliases and the IP addresses of the first terminal and the remote access server in the gatekeeper; transmitting from the first terminal to the gatekeeper a message for requesting a connection with the second terminal; causing the gatekeeper to request the remote access server to connect with the second terminal even when the second terminal is not registered in the gatekeeper; causing the remote access server to request the second terminal to register its alias and IP address in the gatekeeper; and, establishing communication between the first and second terminals through the gatekeeper.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE PREFERRED EMBODIMENTS

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments that depart from these specific details. For the purpose of clarity, detailed descriptions of well-known devices, circuits, and methods are omitted so as not to obscure the description of the present invention with unnecessary detail.

Figure 1:
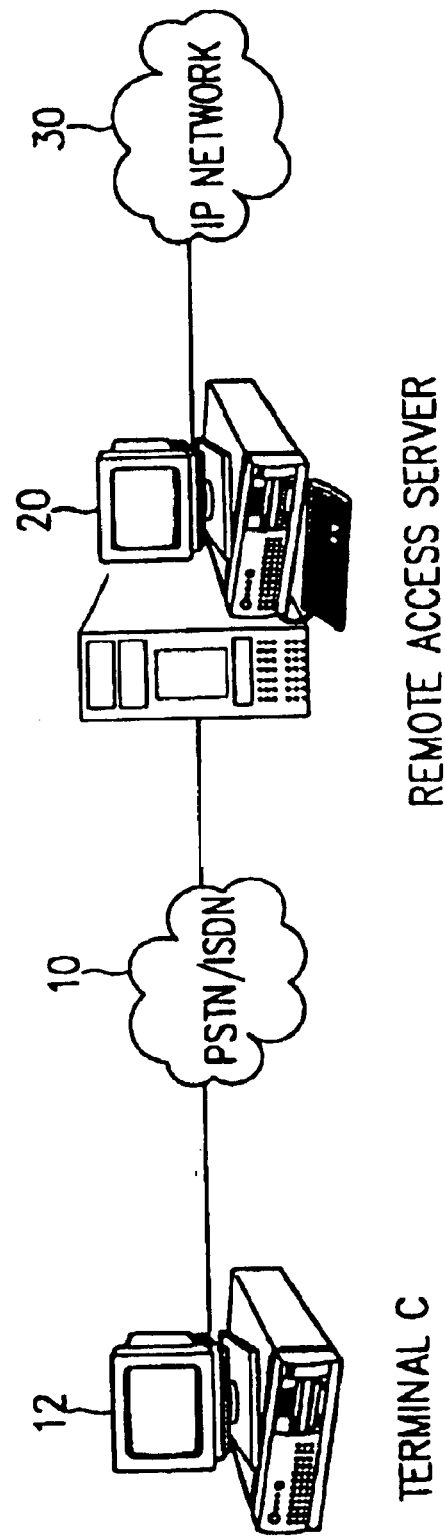
FIG. 1 is a diagram for illustrating the structure of a communication network for a terminal connected to PSTN or ISDN to make a dial-up connection with an IP network through a remote access server.
Figure 2:
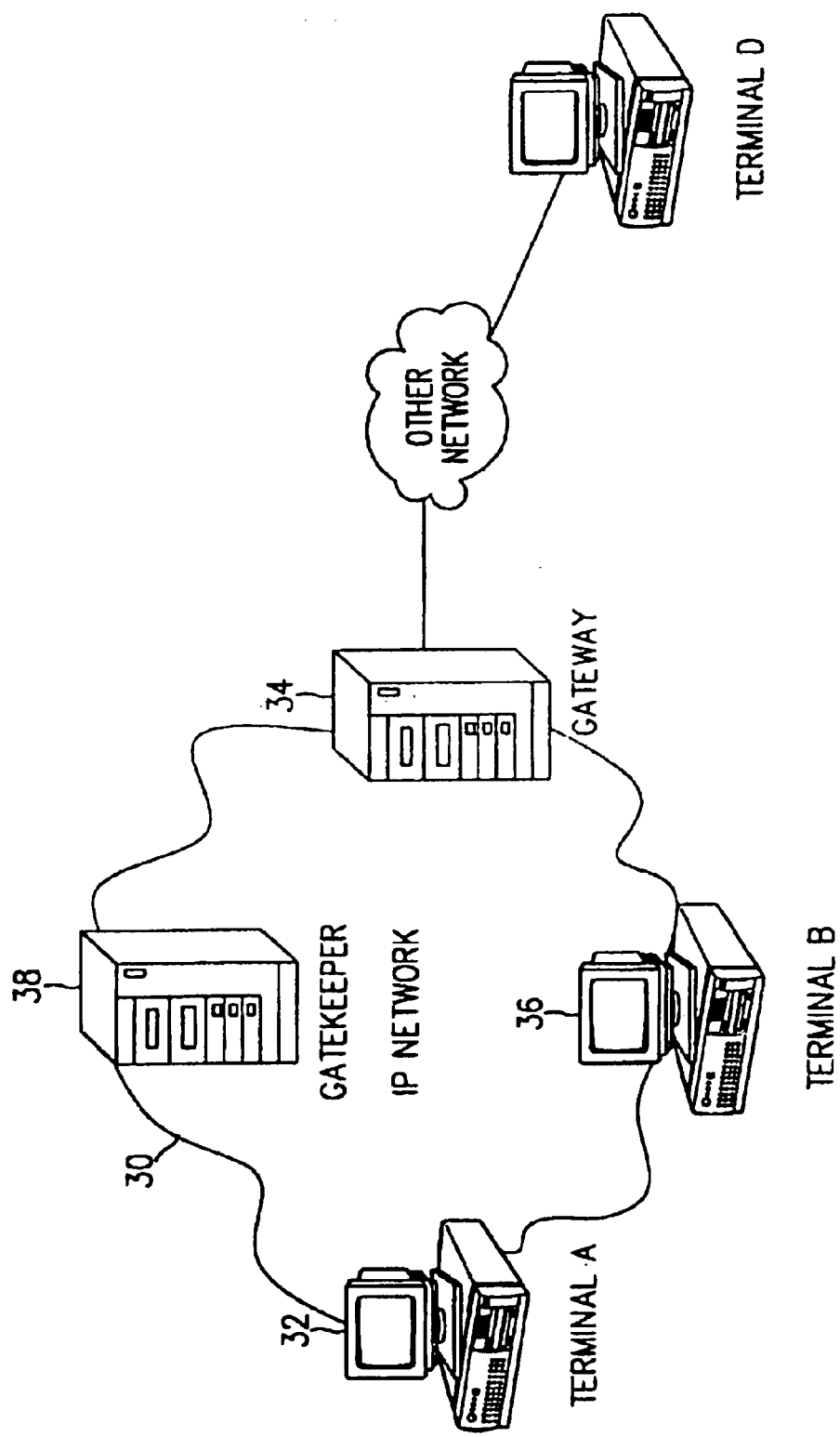
FIG. 2 is diagram for illustrating a communication network recommended by the ITU-T H.323.
Figure 3:
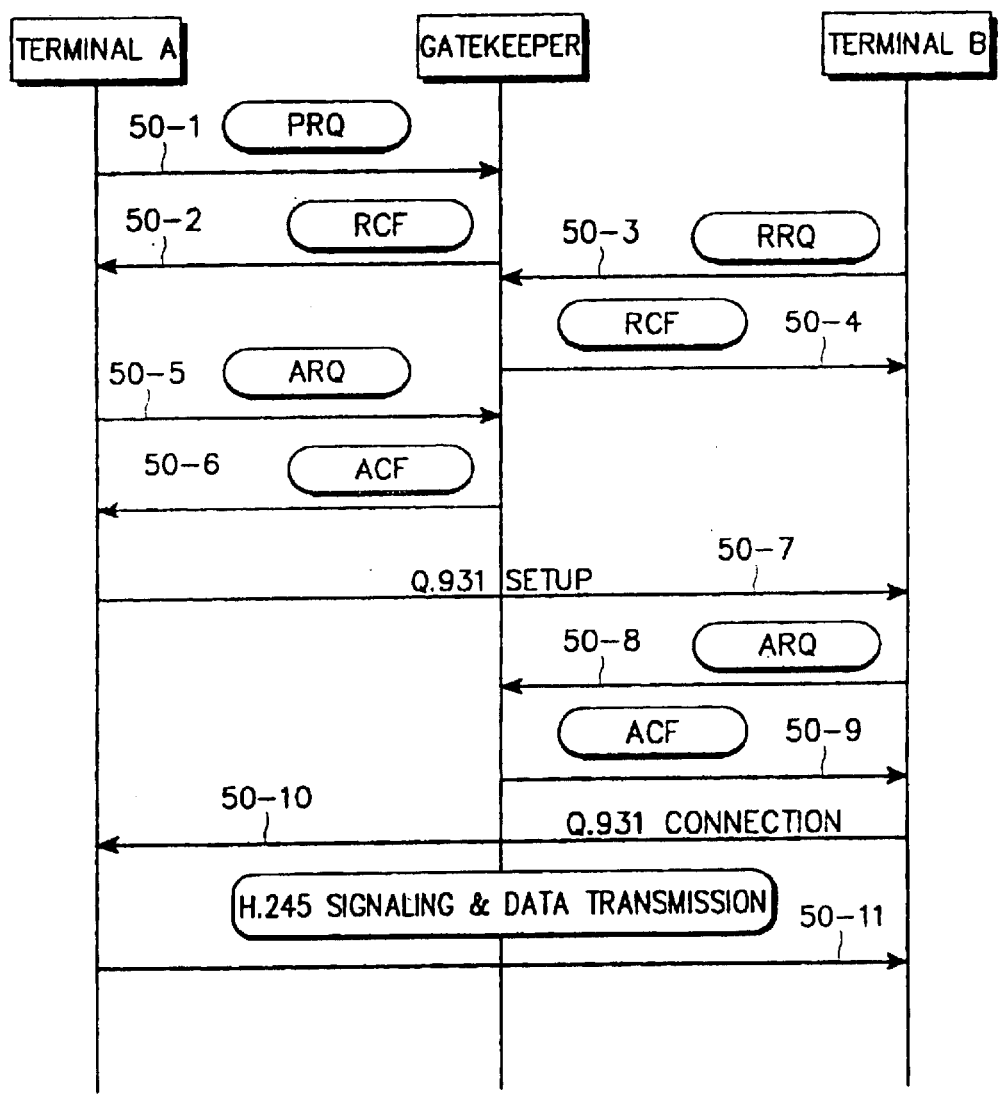
FIG. 3 is a flow diagram for illustrating the flowing of messages between terminals according to the H.323 network.
Figure 4:
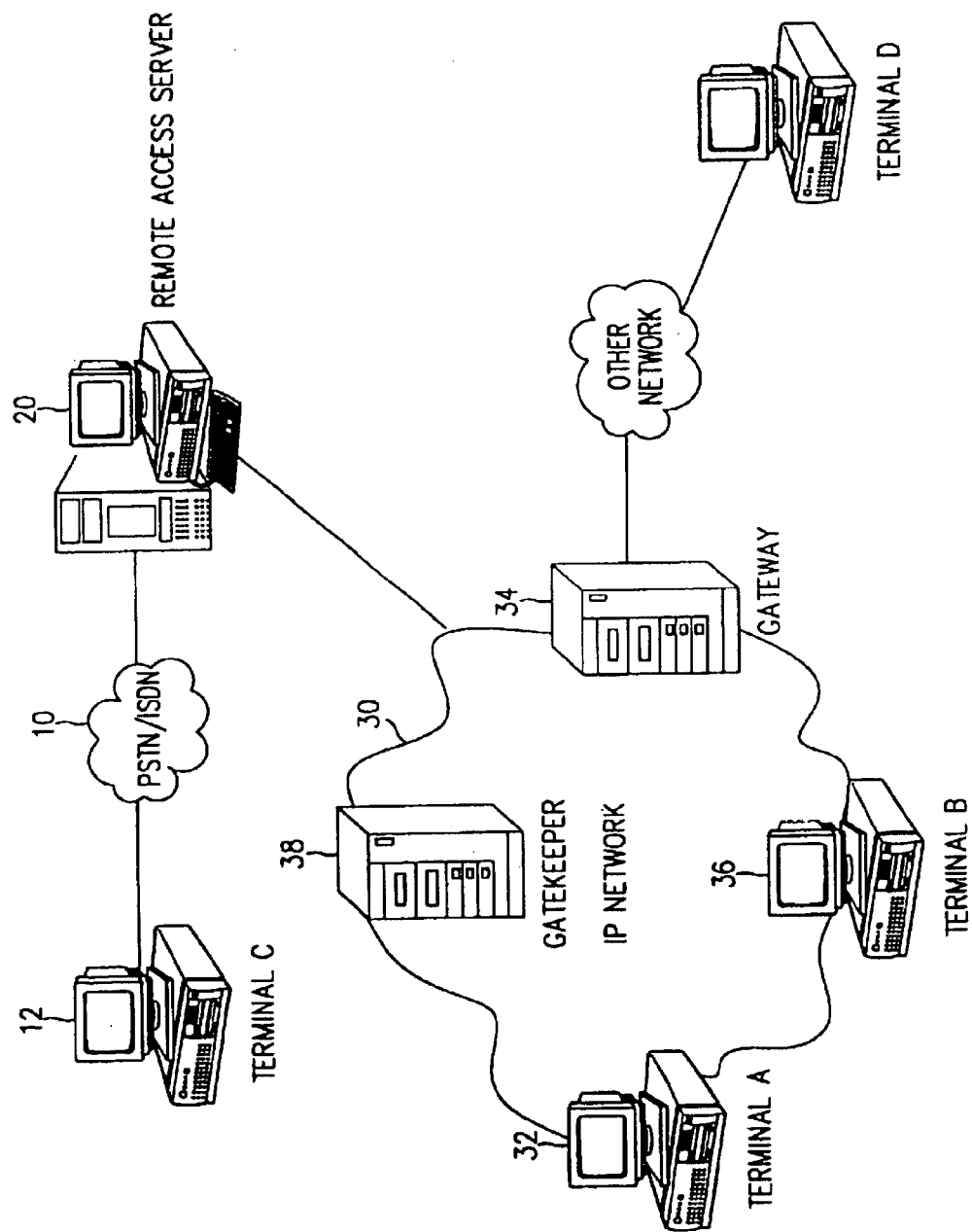
FIG. 4 is a combined network of FIGS. 1 and 2.
Figure 5:
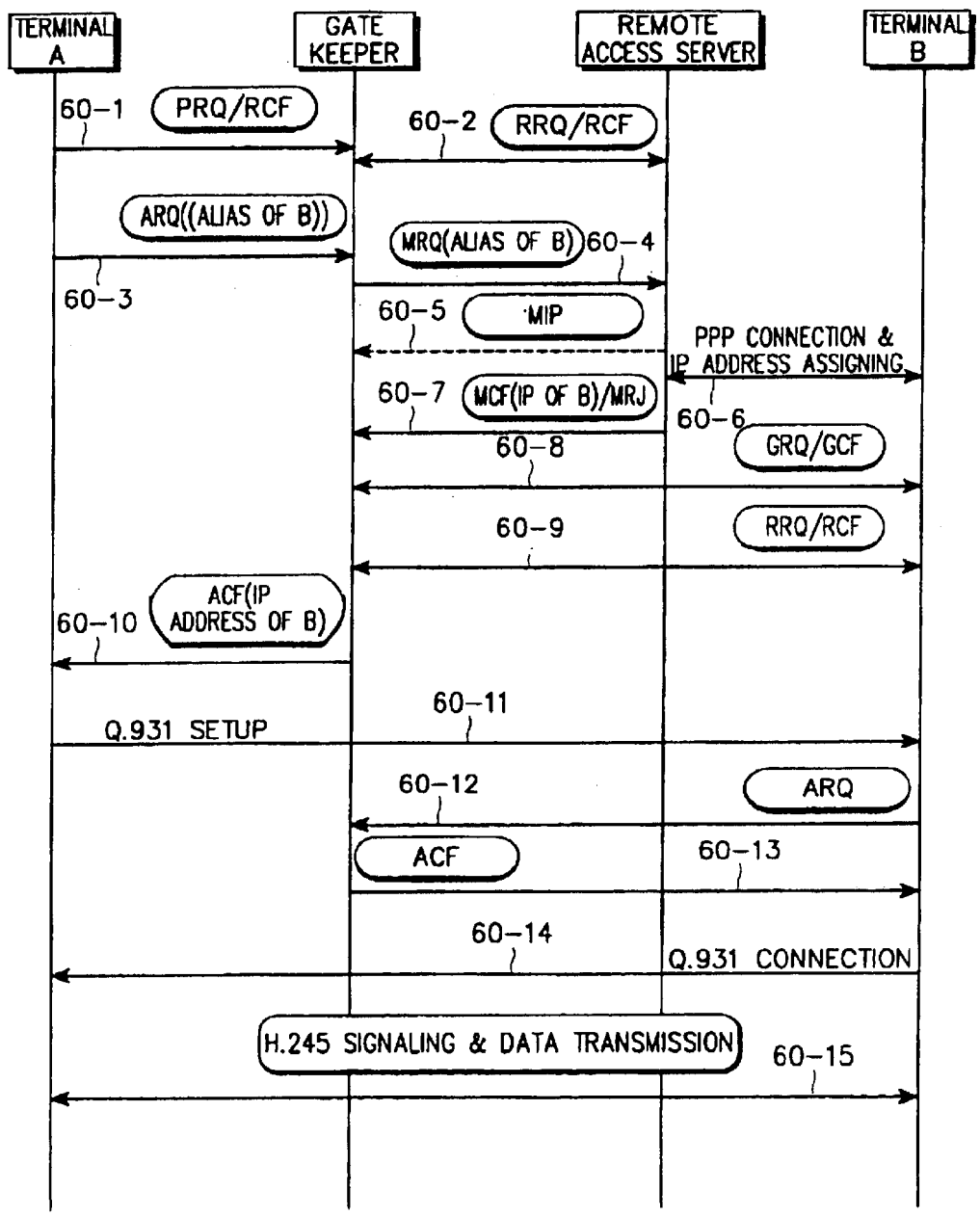
FIG. 5 is a flow diagram for illustrating the process of connecting the terminal of an IP network and the terminal connected to the remote access server according to the present invention.

The present invention provides a communication protocol between a gatekeeper and a remote access server according to the message flows as shown in FIG. 5, and the message syntax and the data structure comply with the Abstract Syntax Notation No. 1 (ASN.1), as shown in Table 1.

TABLE 1

```
ModemGWInfo = SEQUENCE
{
    dataRatesSupported      SEQUENCE OF DataRate,
    supportedPrefixes       SEQUENCE OF SupportedPrefix
    ...
}
ModemMessage = CHOICE
{
    modemDialOutRequest     ModemDialOutRequest,
    modemDialOutConfirm     ModemDialOutConfirm,
    modemDialOutReject      ModemDialOutReject,
    modemDialOutProgress    ModemDialOutProgress
}
ModemDialOutRequest = SEQUENCE - - MRQ
{
    destAlias       AliasAddress,
    timeToWait      INTEGER(0 . . . 256) OPTIONAL - - in seconds
}
ModemDialOutConfirm = SEQUENCE - - MCF
{
    endpointIdentifier      EndpointIdentifier,
    destRasAddress          TransportAddress OPTIONAL
}
ModemDialOutReject = SEQUENCE - - MRJ
{
    endpointIdentifierEndpointIdentifier,
    rejectReason                ModemDialOutRejectReason
}
ModemDialOutRejectReason = CHOICE
{
    resourceUnavailable   NULL,   - - no available port
    destinationBusy       NULL,   - - destination is busy
    ...
}
```

TABLE 1-continued

```
ModemDialOutProgress = SEQUENCE - - MIP
{
    endpointIdentifierEndpointIdentifier,
}
```

Most of the terminology used in Table 1 comply with the ITU-T H.323 and H.225.0 Ver. 2 standards. The following terminology is incorporated in accordance with the present invention: ModemDialOut Request (MRQ), ModemDialOut Confirm (MCF), ModemDialOut Reject (MRJ), and ModemDialOut in Progress (MIP). These additional terms are exchanged according to non-standard messaging ("nonStandardData") allowed in the "NonStandardMessage" of the H.225.0 RAS standards. In addition, there has been proposed a data structure defined by "modemGWInfo" used in "terminalType" in the conventional RRQ message as set forth under the ITU-T H.323 and H.225.0.

The format of the RRQ message, namely the Non-Standard Message under the ITU-T recommendation following is as follows:

```
NonStandardMessage      : : = SEQUENCE
{
    nonStandardData         NonStandardParameter,
}
NonStandardParameter    : : = SEQUENCE
{
    nonStandardIdentifier   NonStandardIdentifier
    data                    OCTET STRING
}
NonStandardIdentifier   : : = CHOICE
{
    object                  OBJECT IDENIFIER
    h221NonStandard         SEQUENCE
    {
        t35CountrCode       INTEGER (0 . . . 255),  - -country, per T.35
        t35Extension        INTEGER (0 . . . 255),  - - assigned nationally
        manufacturerCode    INTEGER (0 . . . 65535) - - assigned nationally
    }
}
```

The ModemDialOut Request (MRQ) is a message sent by the gatekeeper to the remote access server when the gatekeeper receives the Admission Request (ARQ) message from a first terminal requesting a connection with a second terminal that is not registered with the gatekeeper. That is, the second terminal is to be connected through the remote access server according to the embodiment of the present invention. Here, the ModemDialout Request (MRQ) message contains the telephone number ("destAlias") of the second terminal and the time limit ("timeToWait") for waiting a response to the MRQ message.

The ModemDialOut Confirm (MCF) is a message for notifying the gatekeeper that the remote access server has made a PPP connection with the second terminal and has assigned an IP address thereto in response to the MRQ message. The assigned IP address may be included in the "destRasAddress".

The ModemDialOut Reject (MRJ) is a message for notifying the gatekeeper that the remote access server can not make a connection to the second terminal in response to the ModemDialOut Request (MRQ) message. The reason for the rejection is included in the "rejectReason".

The ModemDialOut in Progress (MIP) is a message for notifying the gatekeeper that the remote access server is in progress for making a connection to the second terminal, and that the remote access server can not send a message responding to the ModemDialOut Request (MRQ) message during the "timeTowait" period.

Referring to FIG. 5, both the terminal A of the IP network and the remote access server send the respective Registration Request (RRQ) messages to register their aliases and IP addresses in steps 60-1 and 60-2.

In this case, the remote access server designates "terminalType" for the gateway in the RRQ message. The gateway is defined by a data structure "GatewayInfo," whose "nonStandardData" is used for notifying its information. The "nonStandardData" is defined by the structure "nonStandardParameter", which consists of "nonStandardIdentifier" and data. The "nonStandardIdentifier is defined by the structure "NonStandardIdentifier" consisting of object or "h221NonStandard," and the object is used to designate the object identifier of the remote access server. The data of "nonStandardParameter" employs a structure "ModemGWInfo" as shown in Table 1. Other fields of the RRQ message are the same as in other terminals.

Thereafter, if the gatekeeper sends the RCF message for notifying the terminal A and the remote access server of the completion of the registration, respectively, in steps 60-1 and 60-2, the terminal A sends the Admission Request (ARQ) message to the gatekeeper in order to communicate with the terminal C, in step 60-3. Upon detecting the alias of the terminal C contained in the ARQ message from the terminal A, the gatekeeper sends the ModemDialOut Request (MRQ) message to the remote access server in step 60-4, so that the remote access server can attempt to make a dial-up PPP connection with the terminal C in step 60-6. At this time, if there is no available port or if the terminal C is busy, the remote access server sends the ModemDialOut Reject (MRJ) message to the gatekeeper in step 60-7. While the remote access server attempts to make the PPP connection with the terminal C, it sends the ModemDialOut in Progress (MIP) message to the gatekeeper within the time interval specified in the MRQ message in step 60-5. Then, if the PPP connection and the assigning of the IP address is accomplished, the remote access server sends the ModemDialOut Confirm (MCF) message to the gatekeeper in 60-7.

Subsequently, when the gatekeeper waits for the registration of the terminal C, the terminal C sends the Gatekeeper Request (GRQ) message to seek the registration to the gatekeeper. Upon receiving the Gatekeeper Confirm (GCF) message in response to the GRQ message from the gatekeeper in step 60-8, the terminal C sends the Registration Request (RRQ) message to the gatekeeper to register its alias and IP address. Then, the gatekeeper sends the Registration Confirm (RCF) message to confirm the registration of the terminal B in step 60-9.

Then, the gatekeeper sends the Admission Confirm (ACF) message to the terminal A to admit the communication in step 60-10. Here, the ACF message represents admission notification that the terminal may communicate with terminal C using Q.931 set up. The subsequent message flow steps after step 60-10 complies with the specification of H.323 standard. Namely, as shown in FIG. 5, if the terminal A, upon receiving the ACF message, sends the Q.931 setup message for call signaling to the terminal C in step 60-11, the terminal C sends the Admission Request (ARQ) message to the gatekeeper for receiving the admission of communication in step 60-12. Upon receiving the Admission Confirm (ACF) message from the gatekeeper in response to the ARQ message in step 60-13, the terminal C sends the Q.931 connection message to the terminal A in step 60-14. Finally, the communication is established in step 60-15 by performing the H.245 call signaling protocol. Here, the termination of the communication is also performed according to the H.323 standard.

As is apparent from the foregoing, the present invention provides a means of enabling the H.323 terminal of the IP network to establish—as occasion demands—the terminal of the PSTN or ISDN that is not presently in communication with the remote access server, by exchanging controlling messages between the gatekeeper and the remote access server. In addition, the inventive method employs the conventional H.225.0 RAS message of the international standard, thereby providing compatibility with the conventional communication system. Furthermore, the terminal coupled to the PSTN or ISDN which is in the off-line mode with the remote access server can be called by the terminal coupled the IP network, thus saving the cost related to maintaining the on-line connection with the remote access server.

The previous description of the preferred embodiments is provided to enable any person skilled in the art to make or use the present invention. The various modifications to these embodiments will be readily apparent to those skilled in the art, and other embodiments without the use of the inventive faculty. Thus, the present invention is not intended to be limited to the embodiments shown herein but is to be accorded the widest scope consistent with the principles and novel features disclosed herein.

What is claimed is:

1. A method for enabling a first terminal of a packet-based network to communicate with a second terminal accessible by a remote access server, comprising the steps of:
   (a) registering the aliases and IP addresses of said first terminal and said remote access server in a gatekeeper connected to said packet-based network;
   (b) transmitting from said first terminal to said gatekeeper a message for requesting a connection with said second terminal;
   (c) causing said gatekeeper to request said remote access server to connect with said second terminal even when said second terminal is not registered in said gate keeper;
   (d) when the remote access server point-to-point connects, and assigns an IP address, to said second terminal by calling said second terminal over a circuit network, causing said second terminal to register the alias and the IP address of said second terminal in said gatekeeper; and,
   (e) establishing communication between said first terminal and said second terminal via said gatekeeper.

2. The method as defined in claim 1, wherein the step (c) of requesting said remote access server to connect with said second terminal further comprising the step of transmitting a message containing the phone number of said second terminal and a predetermined response time period to said remote access server.

3. The method as defined in claim 1, wherein the step (d) of causing said second terminal to register comprises the steps of:
   allowing said remote access server to connect with said second terminal;
   notifying said gatekeeper if said connection to said second terminal is unsuccessful;
   notifying said gatekeeper of the IP address assigned to said second terminal if said connection to said second terminal is successful;

allowing said second terminal register the alias and the IP address of said second terminal in said gatekeeper; and, causing said gatekeeper to admit the registration of said second terminal.

4. The method as defined in claim 3, wherein said connection to said second terminal is unsuccessful when there is no available port or when said second terminal is busy.

5. The method as defined in claim 1, wherein said communication established between said first terminal and said second terminal further includes information associated with H.245 parameters.

6. A method for establishing communication between a first terminal connected to a packet-based network and a second terminal connected to a remote access server, comprising the steps of:

(a) establishing communication between said first terminal and said remote access server via a gatekeeper connected to the packet-based network;

(b) transmitting from said first terminal to said gatekeeper a message for requesting a connection with said second terminal even when said second terminal is not registered in said gatekeeper;

(c) requesting said remote access server by said gatekeeper to connect with said second terminal, the request including an acknowledgment of the availability of resources for communication between said remote access server and said second terminal over a circuit network;

(d) when said remote access server point-to-point connects, and assigns an IP address, to said second terminal by calling said second terminal over said circuit network, registering the IP address of said second terminal in said gatekeeper; and (e) establishing over the connection by said remote access server communication between said first terminal and said second terminal via said gatekeeper.

7. The method as defined in claim 6, wherein the step (c) of requesting said remote access server to connect with said second terminal further comprising the step of transmitting a message containing the phone number of said second terminal and a predetermined response time period to said remote access server.

8. The method as defined in claim 7, wherein the step (d) of registering the IP address of said second terminal in said gatekeeper comprises the steps of:

allowing said remote access server to connect with said second terminal;

notifying said gatekeeper if said connection to said second terminal is unsuccessful;

notifying said gatekeeper of the IP address assigned to said second terminal if said connection to said second terminal is successful;

allowing said second terminal register the alias and the IP address of said second terminal in said gatekeeper; and, causing said gatekeeper to admit the registration of said second terminal.

9. The method as defined in claim 8, wherein said connection to said second terminal is unsuccessful when there is no available resource or when said second terminal is busy.

10. The method as defined in claim 6, wherein said communication established between said first terminal and said second terminal further includes information associated with H.245 parameters.

11. The method as defined in claim 6, wherein the step (a) of establishing said communication between said first terminal and said remote access server comprises the step of storing the IP address of said first terminal and said remote access server in said gatekeeper.

* * * * *